(12) United States Patent
Guell et al.

(10) Patent No.: US 7,180,476 B1
(45) Date of Patent: Feb. 20, 2007

(54) EXTERIOR AIRCRAFT VISION SYSTEM USING A HELMET-MOUNTED DISPLAY

(75) Inventors: Jeff J. Guell, Long Beach, CA (US); Steve E. Schroeder, Hermosa Beach, CA (US); Roderick Leitch, Renton, WA (US); Norman Marstad, Medina, WA (US); Michael DeVogel, Issaquah, WA (US)

(73) Assignee: The Boeing Company, Seal Beach, CA (US)

( * ) Notice: Subject to any disclaimer, the term of this patent is extended or adjusted under 35 U.S.C. 154(b) by 808 days.

(21) Appl. No.: 09/608,234

(22) Filed: Jun. 30, 2000

Related U.S. Application Data

(60) Provisional application No. 60/141,922, filed on Jun. 30, 1999.

(51) Int. Cl.
*G09G 5/00* (2006.01)

(52) U.S. Cl. .............................. 345/7; 349/11; 348/115; 348/148; 340/980

(58) Field of Classification Search ................ 345/7–9; 340/980; 348/53, 115–117, 208, 262, 563–565, 348/143, 144, 147, 148, 207.99, 208.6, 48; 359/464, 643, 648, 630–631; 701/14; 250/334; 349/11

See application file for complete search history.

(56) References Cited

U.S. PATENT DOCUMENTS

| | | | |
|---|---|---|---|
| 3,076,961 A * | 2/1963 | Bibbero | |
| 4,057,782 A | 11/1977 | Muller | |
| 4,649,504 A * | 3/1987 | Krouglicof et al. | 340/705 |
| 4,805,015 A | 2/1989 | Copeland | |
| 5,166,789 A * | 11/1992 | Myrick | 358/109 |
| 5,237,418 A * | 8/1993 | Kaneko | 358/183 |
| 5,317,394 A | 5/1994 | Hale et al. | |
| 5,321,416 A * | 6/1994 | Bassett et al. | 345/8 |
| 5,343,313 A * | 8/1994 | Fergason | 345/8 |
| 5,371,510 A * | 12/1994 | Miyauchi et al. | 345/7 |
| 5,414,439 A * | 5/1995 | Groves et al. | 345/7 |
| 5,418,364 A * | 5/1995 | Hale et al. | 250/334 |
| 5,549,259 A | 8/1996 | Herlik | |

(Continued)

*Primary Examiner*—Lun-Yi Lao
(74) *Attorney, Agent, or Firm*—Charles L. Moore; Moore & Van Allen PLLC

(57) ABSTRACT

An improved multiple-sensor vision system for use on vehicles or aircraft. The system utilizes a plurality of fixed sensors, such as infrared sensors, that provide signals that are recorded on tape and/or stored in memory. A processor digitally samples the stored images and provides output to a helmet-mounted display. Desirably, the sensors are arrayed in series such that their images may be juxtaposed and blended to provide a wider field-of-view image. A tracking system desirably monitors the head position of the operator, which position is then used to select various images from the processor. In this way, the operator can select various views by simply looking in that direction. In one embodiment, the array of sensors is forward-looking and positioned close to the head position of the operator to minimize parallax issues. In addition to forward-looking sensors, other sensors mounted around the vehicle/aircraft may provide rearward, hemispherical, or complete spherical coverage. Sensors that monitor the status of various instruments on board the vehicle can also provide input to the helmet-mounted display, including a moving map tile that is displayed below or to the side of the main image.

36 Claims, 6 Drawing Sheets

U.S. PATENT DOCUMENTS

| | | | |
|---|---|---|---|
| 5,572,343 A * | 11/1996 | Okamura et al. | 345/8 |
| 5,670,935 A * | 9/1997 | Schofield et al. | 340/461 |
| 5,736,955 A | 4/1998 | Roif | |
| 5,838,262 A * | 11/1998 | Kershner et al. | 340/945 |
| 6,101,431 A * | 8/2000 | Niwa et al. | 701/14 |
| 6,366,311 B1 * | 4/2002 | Monroe | 348/148 |
| 6,498,620 B2 * | 12/2002 | Schofield et al. | 348/148 |
| 6,809,704 B2 * | 10/2004 | Kulas | 345/1.2 |

* cited by examiner

EXTERIOR AIRCRAFT VISION SYSTEM USING A HELMET-MOUNTED DISPLAY

RELATED APPLICATION

The present invention claims the benefit of priority under 35 U.S.C. §119(e) of Provisional Application No. 60/141,922, filed Jun. 30, 1999.

FIELD OF THE INVENTION

The present invention pertains to a system for enhancing the exterior vision from an aircraft and, more particularly, to a system of a plurality of sensors that provide signals to a helmet-mounted display and enhance the situational awareness of a pilot in low visibility environments.

BACKGROUND OF THE INVENTION

Various systems for enhancing the vision of pilots in low visibility environments are available. Such environments include operations at nighttime, during periods of low cloud cover, in stormy weather, through smoke clouds, or combinations of the above and the like.

One current system in use on the C-130 and C-141 military aircraft is a turret-mounted Forward-Looking Infrared (FLIR) sensor typically mounted to the underside of the front of the aircraft. This system requires a dedicated operator/crew member (navigator) who controls the turret's movement and relays the information to the pilot. The image is presented on a Head-Down-Display (HDD). Unfortunately, such a FLIR turret can be disorienting because the sensor is not always pointed in the same direction as the viewer's gaze. Furthermore, the turret and associated ball-mechanism extend outward from the skin of the aircraft, and thus presents a source of aerodynamic drag. Moreover, the various moving parts of the turret reduce the reliability and Mean Time Between Failures (MTBF) of the system.

Another approach to enhance a pilot's vision is the use of night vision goggles. In contrast to infrared sensors, which respond to thermal differentials, night vision goggles can only see objects that radiate at least a minimum of light energy to the goggles, and thus cannot "see" through dense cloud cover, for example. For this same reason, night vision goggles require a window to see through. Night vision goggles have a relatively limited field of view, so-called "tunnel vision," that requires aggressive scanning for situational awareness and spatial orientation, thus increasing the workload and physical fatigue of the pilot or navigator. Additionally, large or intense light sources may tend to cause night vision goggles to "bloom" such that the image is blurred.

Another vision enhancement system utilizing an array of staring sensors fixed to a host platform (e.g., an aircraft) is disclosed in U.S. Pat. No. 5,317,394 to Hale, et al. The term "staring" refers to a sensor that has a fixed viewpoint, as opposed to a turret-mounted sensor, for example. Each sensor produces signals corresponding to positions of objects within a field of view over time. At least one sensor signal memory receives those signals and stores them in a manner enabling concurrent access to signals received from any selected combination of sensors. The processing unit and associated memory contain at least one program for selecting sensor signals from a sensor signal memory, and producing a selected image on a display, such as a CRT or LED attached to an operator's headgear.

Despite these attempts to improve visibility, there is still a need for a more robust system that provides enhanced visibility without unduly interfering with the pilot's many operational tasks onboard the aircraft.

SUMMARY OF THE INVENTION

The present invention provides an enhanced vision system for mobile vehicles that includes an array of vision sensors fixedly mounted on the exterior of vehicle, each sensor being capable of generating image signals. A recording medium stores the image signals from the array of vision sensors, and a processor samples the stored image signals from the recording medium and produces an output signal therefrom. A helmet-mounted display connects to the processor and receives the output signal where it is displayed on a see-through visor. A tracking system associated with the helmet-mounted display monitors the movement of the head of the wearer of the display and transmits a tracking signal to processor. The processor, in turn, produces the output signal based on feedback from the tracking signal.

In one embodiment, the vehicle is an aircraft, and the array of vision sensors is mounted close to the cockpit area such that the image signals originate from a location proximate the wearer of the helmet-mounted display. For example, the array of vision sensors may be mounted in the upper radome area of the nose of the aircraft.

The vision sensors may be infrared sensors, and one of the sensors may have higher resolution than the others. Preferably, the higher resolution infrared sensor is located in the center of the array of vision sensors and is forward-looking. If the vehicle is an aircraft, the array of vision sensors may be mounted in the nose area and have a downwardly looking elevational field-of-view, preferably about 24°. Alternatively, the array vision sensors may have a field-of-view straddling a horizontal plane, preferably at least 48°, and more preferably about 51°. In another embodiment, the array of vision sensors provides at least a hemispherical field-of-view, up to a spherical field-of-view.

Desirably, the system includes at least one other sensor separate from the array of vision sensors that provides a separate signal to the processor that then combines it with the output signal. The one other sensor may be a vision sensor oriented differently than the array of vision sensors, for example, the array of vision sensors may be forward-looking and the one other sensor may be rearward-looking. Alternatively, the array of vision sensors provides a series of adjacent image signals that are combined by the processor into a wide field-of-view output signal, and wherein the signal from the one other vision sensor is overlaid onto the wide field-of-view output signal as a picture-in-picture image.

The one other separate sensor may generate a real-time map signal that is combined by the processor into the output signal and displayed on the helmet-mounted display outside an image produced by the array of vision sensors. Alternatively, the one other separate sensor monitors an operational parameter of the vehicle and generates a corresponding signal. For example, the operational parameter may be speed, altitude, attitude, and engine status, or other important parameter for the respective vehicle. A manual input device to processor may be provided, whereby select areas on the helmet-mounted display may be manually disabled.

A further understanding of the nature advantages of the invention will become apparent by reference to the remaining portions of the specification and drawings.

DESCRIPTION OF THE PREFERRED EMBODIMENTS

The present invention provides an enhanced vision system for use in vehicles, in particular aircraft, that increases the safety margin during operations of low visibility. The present system enhances situational awareness and thus increases the margin of safety during reduced visibility and/or low level flight operations, such as take-off/landing, taxiing, approaches, drop zone identification, Short Austere Air Field (SAAF) operations, etc. Although the invention is particularly useful in aircraft, other vehicles that may benefit from system include trucks and automobiles, military vehicles such as tanks, firefighting vehicles, boats and ships, submarines, etc. therefore, it should be understood that the various features of the system may be, with some modification if necessary, transferred from the aircraft environment to other vehicles.

Additionally, the present enhanced vision system relies on a plurality of fixed or "staring" sensors of various kinds. A particularly useful sensor is an infrared sensor mounted on the exterior of an aircraft. However, conventional video cameras, sonar, imaging sensors such as millimeter wave or charged couple device sensors, computer-generated images, or the like, may provide input to the system of present invention as needed. As will be described below, the outputs from two or more of these sensors may be combined and displayed simultaneously to the operator to providing greater situational awareness above and beyond enhanced vision. For example, a sensor that monitors various operating parameters of the vehicle, such as speed, altitude/ attitude, and engine status, may provide input that is simultaneously display adjacent an enhanced vision image.

Figure 1A:
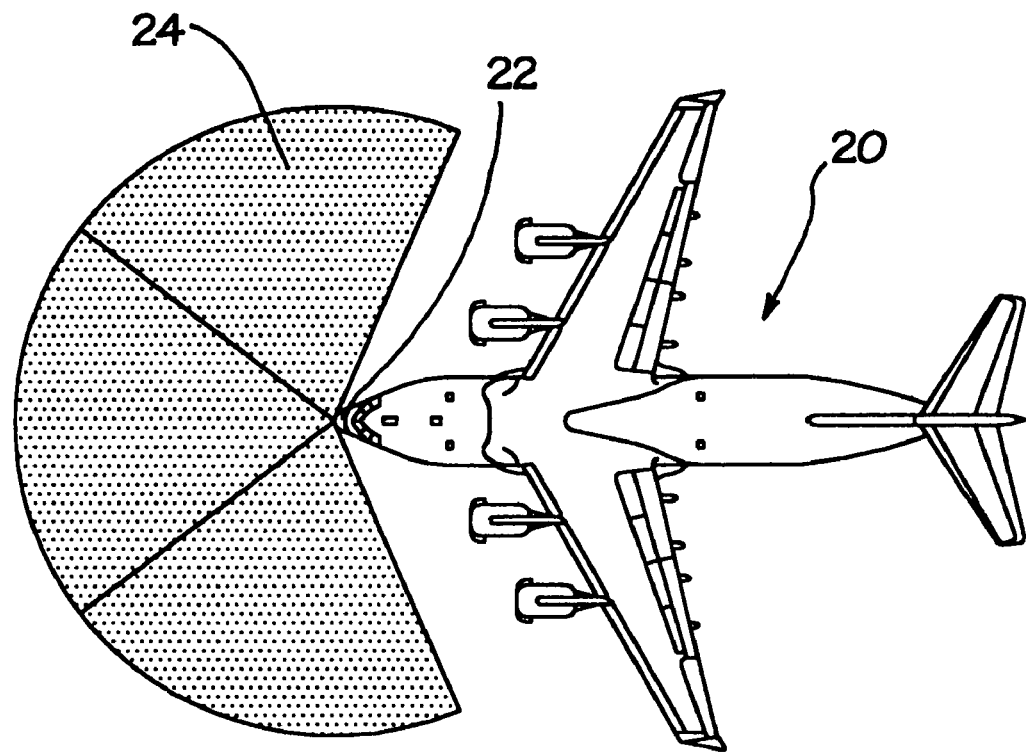
FIG. 1A is a top plan view of an aircraft having the enhanced vision system of the present invention and schematically illustrating an azimuthal field of view provided by the system.
Figure 1B:
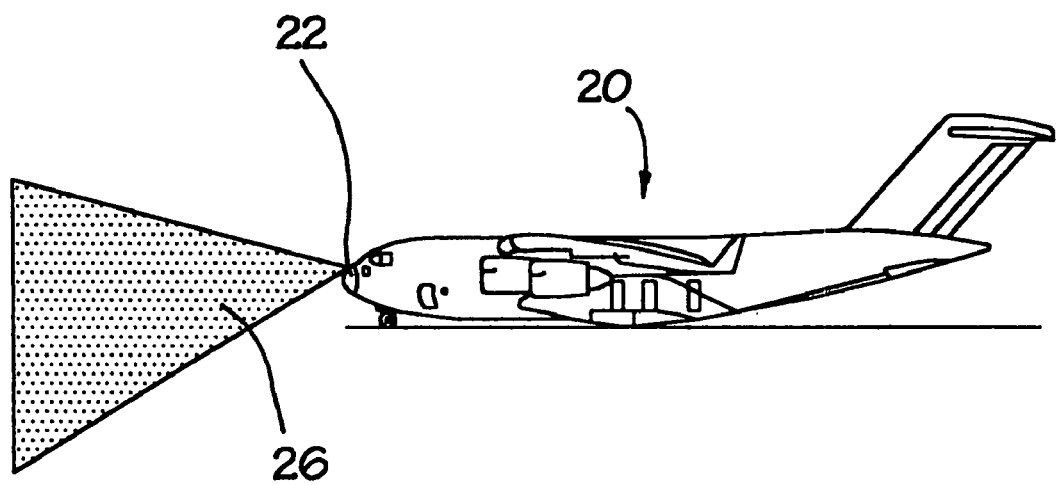
FIG. 1B is a side elevational view of an aircraft having the enhance vision system of the present invention and schematically illustrating an elevational field of view provided by the system.

With reference to FIGS. 1A and 1B, an aircraft 20 having the enhanced vision system of the present invention incorporated therein is shown, along with exemplary fields of view from the forward end of the aircraft thus provided. The aircraft illustrated is a C-17 military transport, but it will be understood that the system of the present invention is equally applicable to other aircraft, and other vehicles. In one embodiment of the system, a plurality of sensors, such as infrared sensors, are mounted on the nose 22 of the aircraft 20, preferably within the upper radome area. Mounting the sensors in this location helps to reduce the disorientation of the pilot or other system operator within the cockpit from parallax phenomena. That is, the sensors are mounted relatively close to the eye-level perspective of the pilot/crew member so as to achieve the effect of a second pair of eyes, as opposed to a less coherent image from a wing-mounted sensor, for example. Nevertheless, sensors placed a distance from the cockpit may be utilized to supply a variety of images to the operator, as will be more fully described below.

The sensors desirably provide an azimuthal field of view 24 (in the horizontal plane during level flight) as indicated in FIG. 1A of between 150°–225°. In another embodiment of the system, as described below, a greater azimuthal field of view up to 360° may be provided. The elevational field of view 26 (in the vertical plane during level flight) of the first embodiment, as shown in FIG. 1B, ranges between 24°–48° although, again, the embodiment described below may have greater elevational vision capability.

Figure 2:
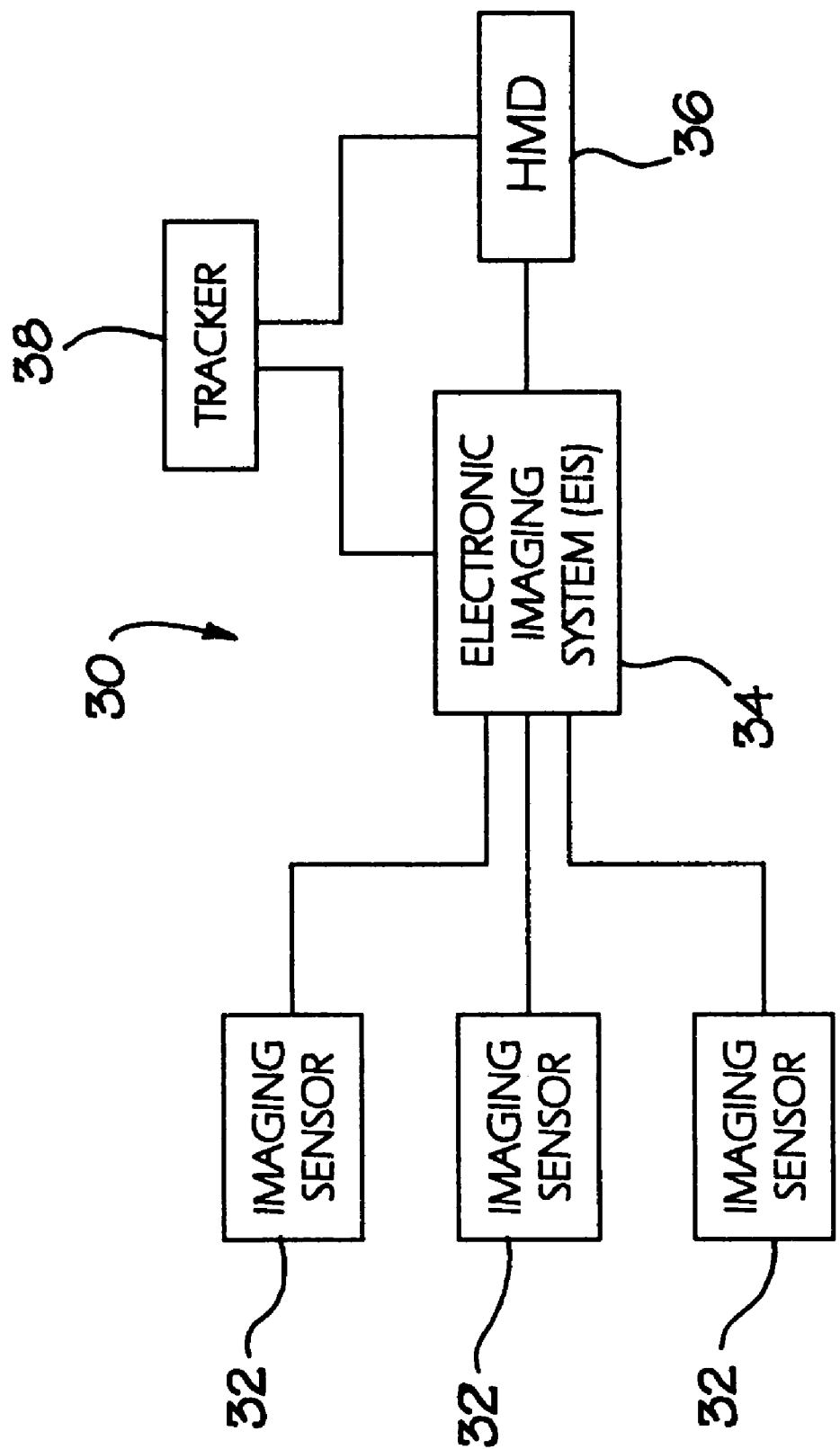
FIG. 2 is a schematic diagram showing the main components of the enhanced vision system of the present invention and their interconnections.
Figure 3:
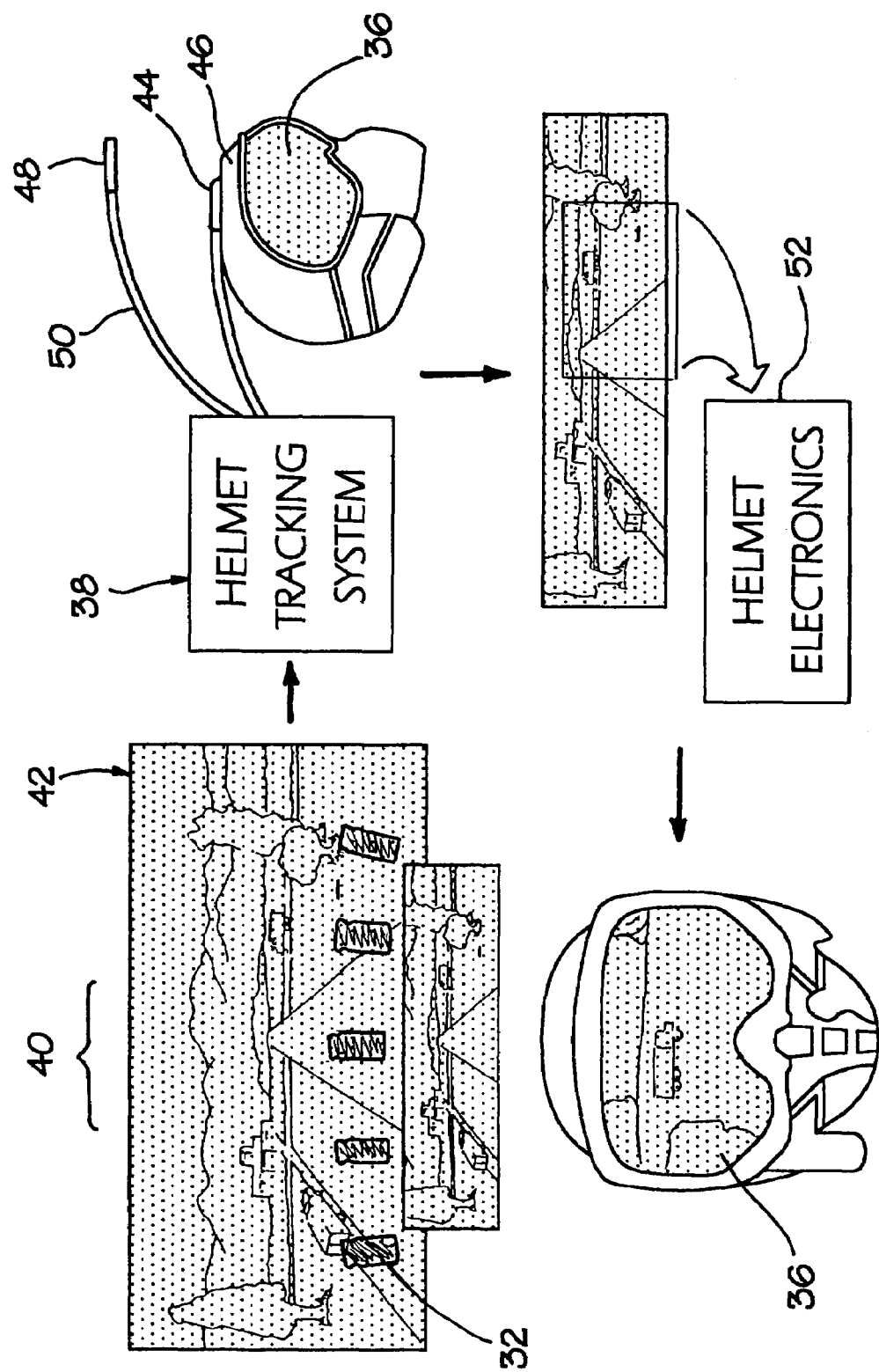
FIG. 3 is a pictorial illustration of certain components of the enhanced vision system of the present invention, including a helmet-mounted display and a helmet tracking system.

FIG. 2 illustrates a simple schematic diagram of the components of the enhanced vision system 30 of the present invention. A plurality of imaging sensors 32 positioned at strategic locations, such as in the upper radome area of the aircraft 20, supply signals to an electronic imaging system 34, or CPU. The imaging system 34, in turn, processes the signals from the sensors 32 and outputs them to a helmet-mounted display 36. A tracker 38 monitors movement of the helmet-mounted display 36 and provides that information to the imaging system 34. In this manner, real-time movements of the operator wearing the helmet-mounted display 36 cause the imaging system 34 to alter which imaging sensor 32, or combination of sensors, is sampled. This feedback loop thus permits the operator to scan across a number of images produced by the sensors 32 by simply turning his or her head:

FIG. 3 pictorially illustrates the various inputs to the helmet-mounted display 36. Specifically, a plurality of imaging sensors 32 arrayed in a line or arc generates a number of adjacent "tiles" 40 of a panoramic view 42. The images of the tiles 40 are combined with information from the helmet tracking system 38, as mentioned above. The tracking system 38 may include an emitter 44 fixedly mounted on a helmet 46 having the helmet-mounted display 36, and a detector or sensor 48 spaced from the emitter in a known relationship. In the illustrated embodiment, the sensor 48 is suspended on an elongate cable 50 extending above the helmet 46. As the helmet 46 moves, the emitter 44 moves with respect to the sensor 48, which relative motion is sensed and processed by the tracking system 38. The images of the tiles 40 and information from tracking system 38 are then processed, such as in the imaging system 34 shown in FIG. 2, and an appropriate processed image is sent to the helmet electronics 52 that generate the image on the helmet-mounted display 36.

Figure 4:
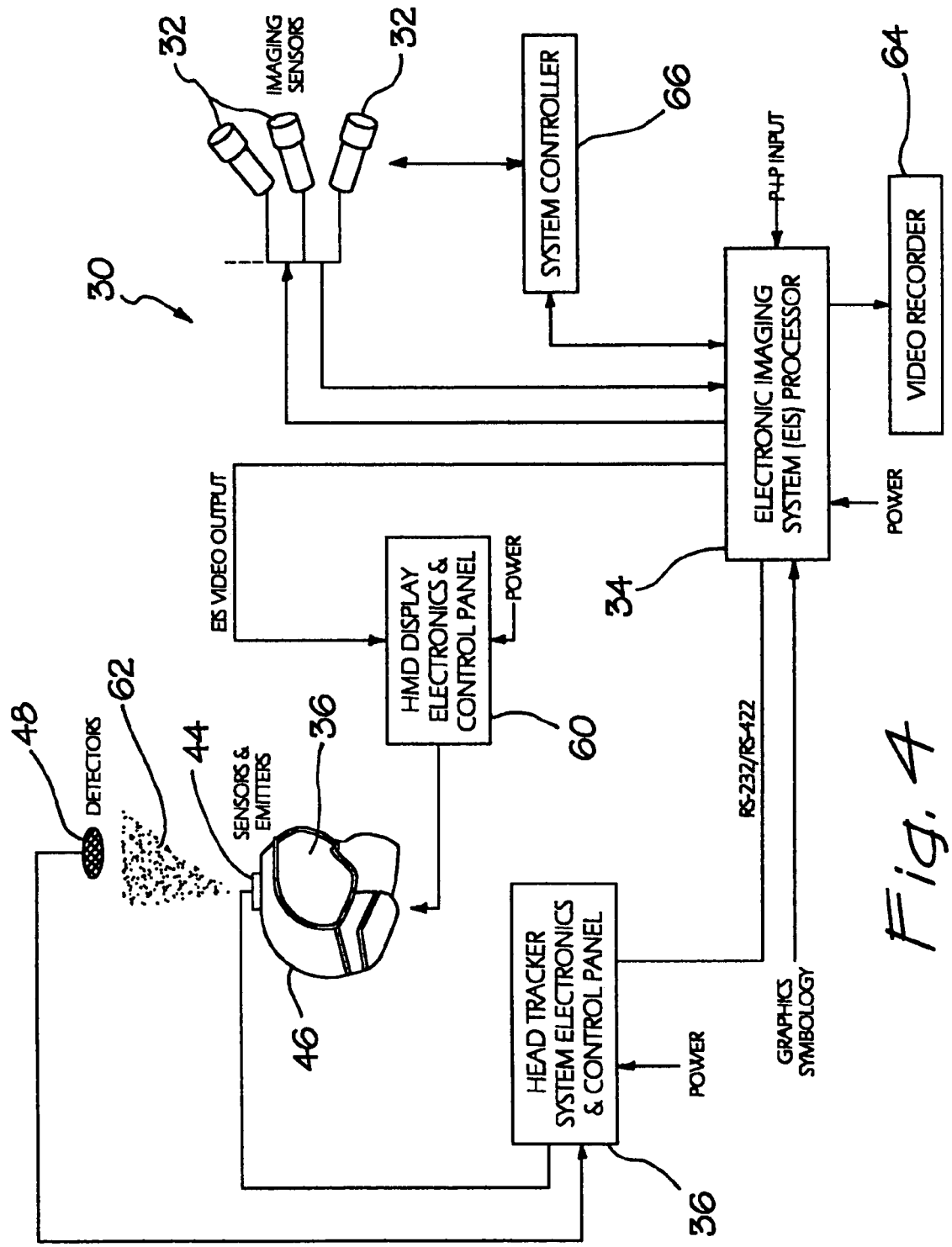
FIG. 4 is a more comprehensive schematic view of the enhanced vision system of the present invention.

With reference now to FIG. 4, a more complete schematic diagram of the system 30 of present invention is shown. As described above, the system 30 includes a helmet-mounted display 36 within a helmet 46, and an accompanying electronics and control panel 60. The emitter 44 is shown mounted on top of the helmet 46 and emits signals 62 to the sensor 48 positioned thereabove. The head tracker system electronics and control panel 38 monitors the spatial relationship between the emitter 44 and sensor 48 and provides such information to the electronic imaging system processor 34. The processor 34 receives signals from the imaging sensors 32 and records those signals on a video recorder 64 (alternatively, the images may be stored digitally on an optical or magnetic media). Based on input from the head tracker system electronics 38, the appropriate images from sensors 32 as stored on the video recorder 64 are output to the helmet-mounted display electronics and control panel 60. Finally, a system controller 66, such as a key pad or keyboard, provides the operator with manual control over variable parameters of the system 30, such as, for example, an option of viewing the image from one or more particular sensors 32 as opposed to whichever sensors are selected by the head tracker system 38.

Figure 5A:
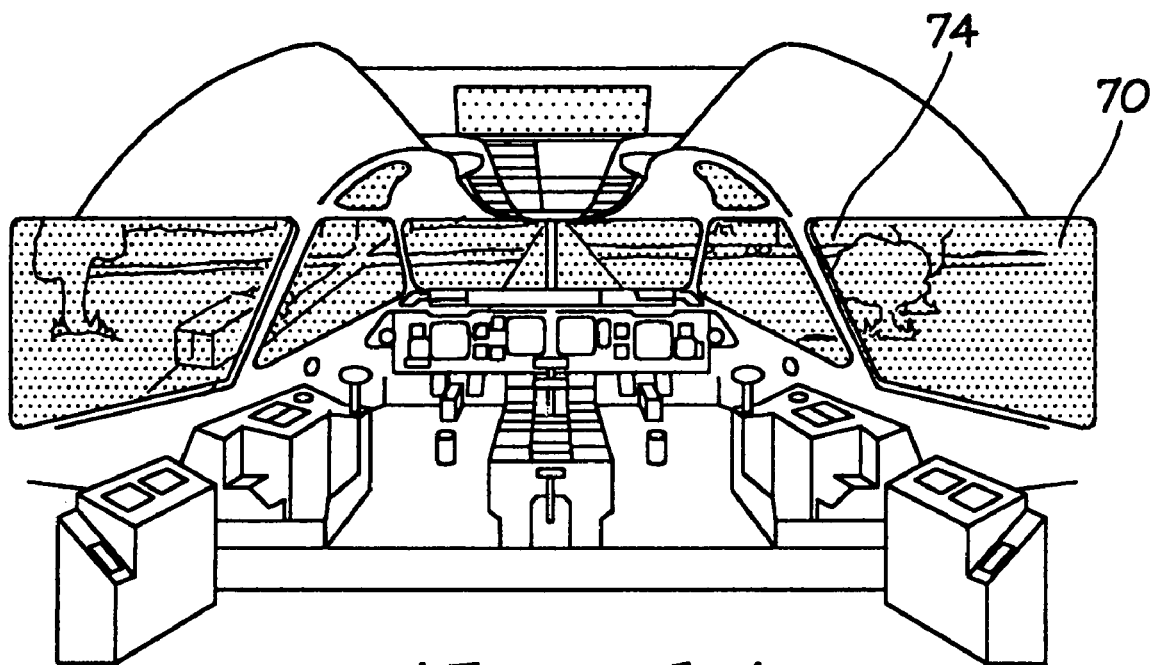
FIG. 5A is an elevational view of the interior cockpit area of an aircraft illustrating the potential exterior field of view of a crew member through the forward-looking windows of the aircraft.
Figure 5B:
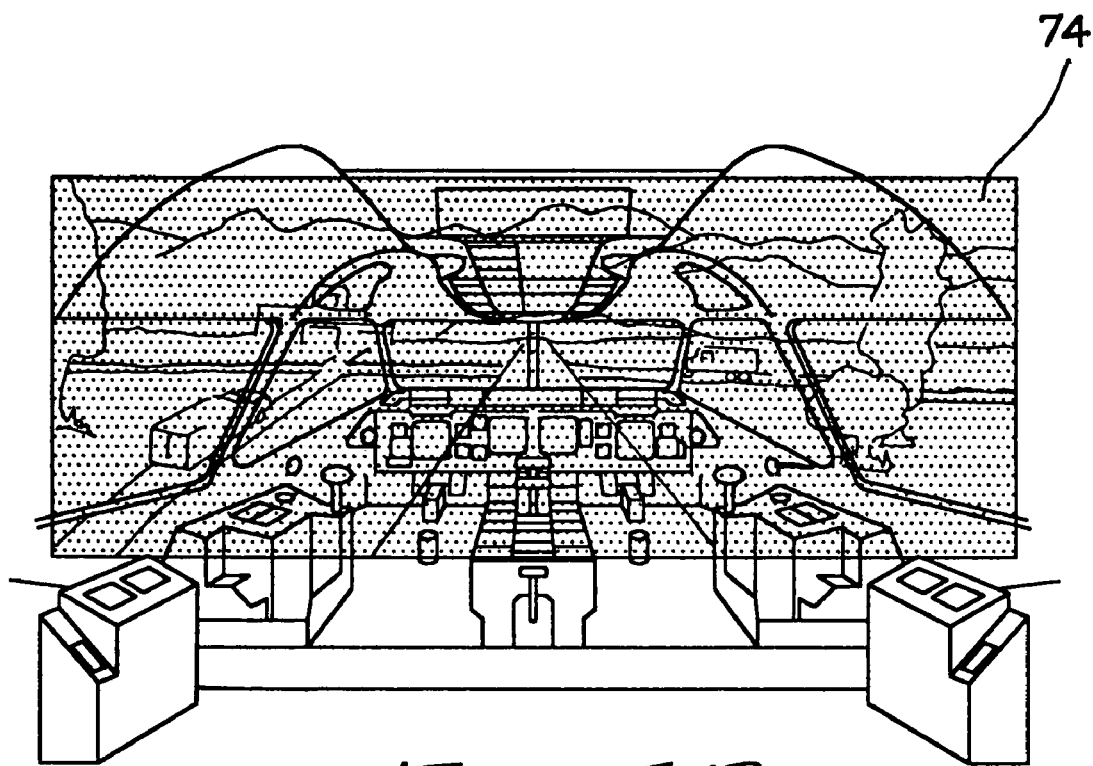
FIG. 5B is an elevational view of the interior cockpit area of an aircraft similar to FIG. 5A, and illustrating the field of view of a crew member using the enhance vision system of the present invention.

FIGS. 5A and 5B are two views from the inside of a cockpit of an aircraft, the former as seen by the naked eye and the latter as seen using the helmet-mounted display 36 of the present invention. In FIG. 5A, the outside view 70 is limited to what can be seen through the cockpit windows 72. In contrast, FIG. 5B illustrates an enhanced exterior view 74 generated by the helmet-mounted display 36 and superimposed onto the image of the interior of the cockpit seen through the helmet-mounted display visor. That is, the helmet-mounted display visor is a "see-through" type that permits light to pass through whatever image is displayed thereupon. The intensity may be controlled by the system controller 66 of FIG. 4, for example. Alternatively, select regions of the helmet visor may be disabled so that a discrete area of the cockpit can be constantly monitored.

Desirably, the intensity of the enhanced exterior view 74 on the display visor is variable from the lower extreme of being invisible, to the upper extreme of entirely obscuring the operator's view through the visor. In FIG. 5B, for example, an intermediate intensity of the enhanced exterior view 74 permits the operator to see through the visor to the interior of the aircraft, while at the same time viewing the enhanced exterior view 74, which view is larger than that provided by the cockpit windows 72. The benefits of being able to visualize both interior and enhanced exterior scenes in a so-called "glass cockpit" is apparent, and primarily enables the operator to maintain awareness of the cockpit activity while observing the exterior terrain or tracking an exterior target.

The enhanced exterior view 74 of FIG. 5B is illustrated as a series of coextensive image tiles, such as produced by a horizontal array of sensors in the upper radome area of the aircraft. This forward-looking image can be supplemented by various other images provided by visual sensors placed around or in the aircraft, or by sensors that monitor the output of various electronic devices within the aircraft.

Figure 6A:
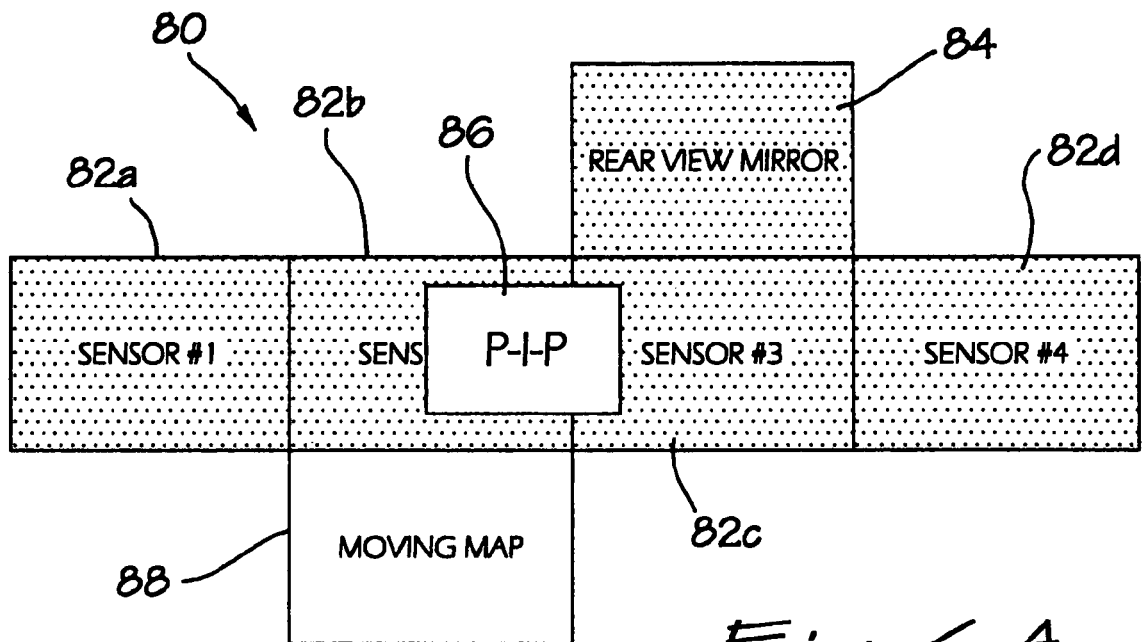
FIG. 6A illustrates an exemplary layout of various display screens generated and juxtaposed by the enhance vision system of the present invention.

FIG. 6A illustrates an arrangement of tiles 80 that can be juxtaposed and viewed on the helmet-mounted display 36. An array of forward-looking tiles 82a–82d are juxtaposed in a horizontal line to provide an enhanced exterior view to the operator. In addition, a rearward-looking tile 84 provides an image that is juxtaposed above the third tile 82c. A small picture-in-picture (P-I-P) tile 86 can be superimposed over any of the other tiles 80, and can provide the status of an electronic device aboard the aircraft, or can provide another picture from a sensor looking in a different direction. For example, the P-I-P 86 may be an image that is generated by a sensor located on a different aircraft, by a sensor located on a missile homing onto a target, or any other such desirable view. Finally, a moving map tile 88 is juxtaposed below the second sensor 82b and provides the operator with an overview of the position of the aircraft. Information may be supplied to the moving map tile 88 from a global positioning system (GPS), from an eye-in-the-sky aircraft such as an AWACS plane, or from another source.

Figure 6B:
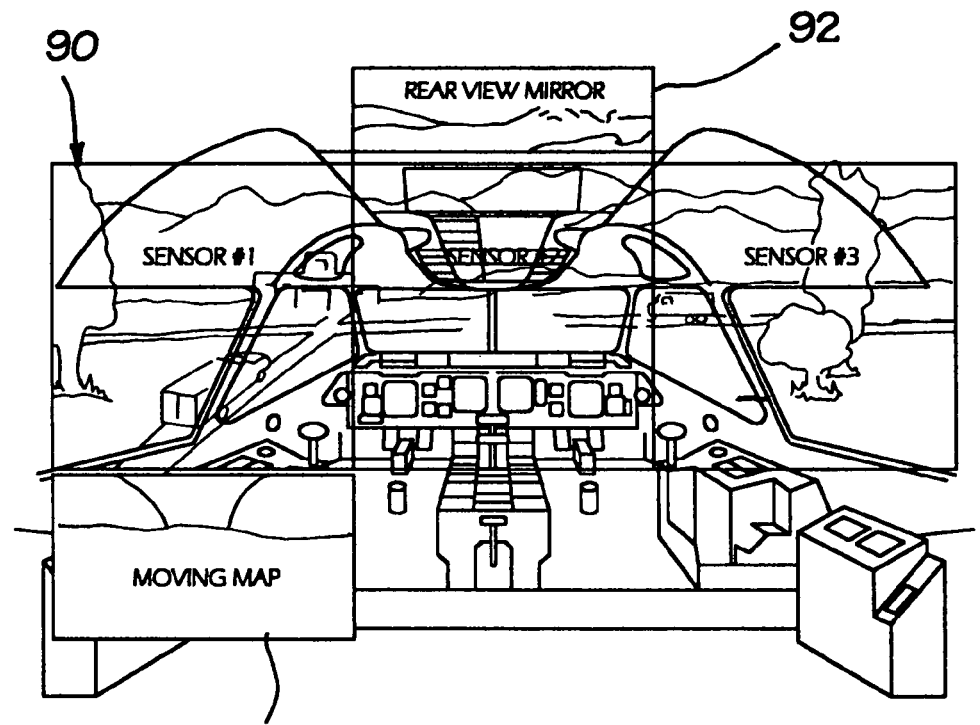
FIG. 6B is an elevational view of the interior cockpit area of aircraft similar to FIG. 5A, with an exemplary layout of images from a number of display screens of the enhanced vision system of the present invention superimposed thereupon.

FIG. 6B illustrates a view from the helmet-mounted display 36 similar to that which would be generated by the arrangement of tiles 80 of FIG. 6A. Three forwardly-looking sensors provided an enhanced exterior view 90. A rearward-looking sensor provides a "rear view mirror" tile 92, and input from a GPS system provides a moving map tile 94. It should be noted that the rear view mirror tile 92 and the moving map tile 94 are located above and below the primary viewing field, respectively, and thus interference with split-section decisions made by the operator based on the enhanced exterior view 90 is minimized.

The present invention thus provides a system for sensing exterior images, capturing those images on videotape (or digitally), and digitizing or otherwise sampling the images for processing and output to the helmet-mounted display. In this manner, adjacent image "tiles" can be overlapped and blended into one continuous panoramic view. The operator can choose to view a wide screen image with multiple tiles, or can zoom in to focus on one or two tiles. Additionally, the provision of an intermediate digital processor enables more than one helmet-mounted display to be utilized, with the same or different image input. That is, two operators within the cockpit of an aircraft can be provided with separate helmet-mounted displays and tracking systems such that each views parallel images generated by the sensors and stored in videotape based on their respective head positions. Thus, for example, one pilot in the cockpit can focus straight ahead during a landing approach, while the other can survey the surrounding terrain for hazards or airspace for threats. Of course, there may be two such processors dedicated to each helmet-mounted display and sampling video images from the same videotape.

The present system eliminates reliance on a turret-mounted sensor, and thus avoids any of the aerodynamic drag and reliability problems associated therewith. The forward-looking sensors, such as the sensors 32 shown in the drawings, are desirably passive infrared sensors each providing a field-of-view of 24° elevationally by 32° azimuthally. A combination of five such sensors thus provides a total field-of-view of 24° elevationally by 150° azimuthally (with approximately 10° of total overlap blended together by the processing system). In one embodiment, the center sensor in an array of five sensors is a cooled mid-wave 640×480 (resolution) Mercury Cadmium Telluride (HgCdTe) sensor that is primarily relied on for the final approach and landing situations. The outer four sensors are 320×240 uncooled microbolometers for situational awareness. The following table lists some exemplary characteristics of the center and outer sensors.

| Performance Parameter | Center Sensor | Outer Sensors |
| --- | --- | --- |
| Detector Type | HgCdTe | Vox |
| Number of Detectors | 640 × 480 | 320 × 240 |

-continued

| Performance Parameter | Center Sensor | Outer Sensors |
|---|---|---|
| Detector Pitch (μm) | 27 | 51 |
| Operability (%) | >98 | >98 |
| Spectral Band (μm) | 3.8–4.8 | 8–14 |
| Cooling | 1 Watt IDCA | Uncooled |
| System FOV (°) | 32 × 24 | 32 × 24 |
| System F/# (°) | 3 | 1 |
| NETD (K) @ 300 K | <0.025 | <0.1 |
| Dynamic Range (db) | >70 | >70 |
| Power (Watts) | <35 | <15 |
| Weight (lb) | <24 | <8 |

In an enhanced version of the present invention, a distributed infrared sensor system provides a larger array of sensors around the vehicle to provide hemispherical or spherical coverage. This requires high-performance (cooled) 1024×1024 format mid-wave Focal Plane Array (FPA) devices. For example, three sensors with a 92°×92° field-of-view can cover a hemisphere, while six can provide a spherical field-of-view. As described above, a higher-resolution forward-looking center sensor can be utilized to support takeoff, landing, and air-to-air refueling. Likewise as described above, a helmet-mounted display can view discrete windows or regions within the hemispherical or spherical sensor coverage. The following table lists some exemplary characteristics of the sensors for the enhanced system.

| Performance Parameter | Specification |
|---|---|
| Focal Plane Array | MWIR HgCdTe (MCT) |
| Number of Detectors (elevation × azimuth) | 1024 × 1024 |
| Detector Pitch (μm) | 18 |
| Fill Factor (%) | >90 |
| Operability (%) | >98 |
| Spectral Band (μm) | MWIR (3.8–4.8) |
| Type of Cooling | 1 Watt Linear Split Stirling Closed Cycle Cooler |
| Cool Down Time (minutes) | <5 @ 300 K |
| FPA Operating Temp. (° K) | 95.0 ± 5.0 |
| MTBF (hours) | >3000 |
| System FOV (°) | 92 × 92 |
| System F/# (°) | 1.5 |
| D (cm-Hz$^{1/2}$/W) | 4.3 × 10$^{11}$ |
| NEI (w/cm$^2$) | <1 × 10$^{-13}$ @ 225 K Background |
| Adjustable Integration Time (msec) | 0.2 to 33 |
| Digital Data Resolution (bits) | 14 |
| Output Video Format | Fiber Channel 14 bit digital data |
| Non-Uniformity Correction | Internal (System self-calibration at startup) |
| Size - Single Sensor Head (inches) | 5 × 6 × 8 |
| Input Power (VDC) | +28 nominal |
| Power Dissipation - Single Sensor Head (Watts) | <50 watts maximum, <40 watts nominal |
| System Weight - Single Sensor Head (lbs) | <8 |

A plurality of aircraft each having the present enhanced vision system may be networked together to a central control facility so that a more global or at least regional perspective results. With the spherical field-of-view sensor arrays, this network of aircraft greatly enhances the ability to detect and track moving targets. Moreover, the 3-dimensional nature of the combined input from multiple aircraft provides robust triangulation and thus locating capability, not only of unknown or hostile targets, but also of each other. The resulting mission critical information can then be made available to all of the aircraft in the area, regardless of whether each has the enhanced vision system or not.

Desirably, an inertial measurement unit (IMU) is integrated with each sensor to supply a reference necessary for inertial stabilization. The stabilization is utilized for accurate mapping of multiple sensor images to the helmet-mounted display. That is, the information from each sensor's IMU is processed to compensate for aircraft maneuvering and structural flexure. A further function of the IMU is to aid in false target rejection by accurately referencing the state of each potential target with information on its azimuth, elevation, and velocity.

In one embodiment, the sensors in the enhanced embodiment of present invention included an infrared search and track (IRST) functional mode so as to provide passive long-range detection and tracking of airborne targets, thus complementing on-board search radar. Because of the multiple functions of the sensors, they do not have the same range capability as a dedicated IRST, but can at least detect a small military fighter in excess of 30 nautical miles which may be sufficient for the pilot to decide whether to engage, evade, or deploy countermeasures.

The primary use of a forward-looking array of sensors, as described above with respect to FIGS. 1A and 1B, is to enhance the pilot's vision for night landings, or in low visibility environments. As such, the vertical field-of-view may be 24° and extend from −3° to −27° below the horizontal horizon. For the enhanced system, on the other hand, mid-air refueling may be the primary concern. Therefore, the vertical field-of-view is increased to a total 51°, and extends from −27° to 24° straddling the horizontal horizon (i.e., 0° elevation). This up-looking orientation enables the pilot to view the refueling tanker at all times.

While the foregoing is a complete description of the preferred embodiments of the invention, various alternatives, modifications, and equivalents may be used. Moreover, it will be obvious that certain other modifications may be practiced within the scope of the appended claims.

What is claimed is:

1. A conformal enhanced vision system for mobile vehicles, comprising:
   an array of vision sensors mounted on a vehicle, each sensor being capable of generating image signals;
   a recording medium for storing the image signals from the array of vision sensors;
   a processor for sampling the stored image signals from the recording medium and producing an output signal therefrom;
   a display connected to receive the output signal from the processor and superimpose images generated by the output signal on a see-through visor which also selectively permits an operator to view real images disposed in front of said visor; and
   a tracking system associated with the display that monitors the movement of the head of the operator and transmits a tracking signal to the processor, the processor producing the output signal based on feedback from the tracking signal;
   wherein both the images generated by the output signal and the real images are in conformity with one another, to create a seamless effect for the operator and wherein images generated by the output signal include an exterior view relative to the vehicle, a portion of the exterior view being partially blocked by the vehicle in the real images viewable by the operator, but the images generated by the output signal of the exterior view being displayable superimposed and in conformity with the real images on the see-through visor and including the portion of the exterior view that is partially blocked by the vehicle in the real images.

2. The system of claim 1, wherein the vehicle is an aircraft, and wherein the array of vision sensors is mounted close to the cockpit area such that the image signals originate from a location proximate the wearer of the display.

3. The system of claim 2, wherein the array of vision sensors is mounted in the upper radome area of the nose of the aircraft.

4. The system of claim 1, wherein the vision sensors are infrared sensors, and wherein one of the infrared sensors has higher resolution than the others and is forward-looking.

5. The system of claim 4, wherein the vehicle is an aircraft and wherein the higher resolution infrared sensor is located in the center of the array of vision sensors for a group including at least one of takeoff, air-to-air refueling and final approach and landing situations.

6. The system of claim 1, wherein the vehicle is an aircraft, and wherein the array of vision sensors is mounted in the nose area and has a downwardly-looking elevational field-of-view.

7. The system of claim 6, wherein the array of vision sensors has an elevational field-of-view of approximately 24°.

8. The system of claim 1, wherein the vehicle is an aircraft, and wherein the array of vision sensors is mounted in the nose area and has a field-of-view straddling the horizontal horizon.

9. The system of claim 8, wherein the array of vision sensors has an elevational field-of-view of approximately 51°.

10. The system of claim 1, wherein the array of vision sensors provides at least a hemispherical field-of-view.

11. The system of claim 10, wherein the array vision sensors provides a spherical field-of-view.

12. The system of claim 1, wherein at least one of the vision sensors additionally provides an infrared search and track function.

13. The system of claim 1, further including at least one other sensor separate from the array of vision sensors that provides a separate signal to the processor that then combines it with the output signal.

14. The system of claim 13, wherein the one other sensor is a vision sensor oriented differently than the array of vision sensors.

15. The system of claim 14, wherein the array of vision sensors is forward-looking, and wherein the one other vision sensor is rearward-looking.

16. The system of claim 14, wherein the array of vision sensors provide a series of adjacent image signals that are combined by the processor into a wide field-of-view output signal, and wherein the signal from the one other vision sensor is overlaid on the wide field-of-view output signal as a picture-in-picture image.

17. The system of claim 13, wherein the one other sensor generates a real-time map signal that is combined by the processor into the output signal and displayed on the display outside an image produced by the array of vision sensors.

18. The system of claim 13, wherein the one other sensor monitors an operational parameter of the vehicle and generates a corresponding signal.

19. The system of claim 18, wherein the operational parameter of the vehicle is selected from the group consisting of:
   speed;
   altitude;
   attitude; and
   engine status.

20. The system of claim 1, and further including a manual input device to the processor, wherein the output signal may be manually disabled in select areas on the helmet-mounted display.

21. The system of claim 1, wherein said display comprises a helmet-mounted display.

22. The system as recited in claim 1, wherein each vision sensor is fixedly mounted on the vehicle and comprises a non-turret mounted immovable sensor.

23. A conformal enhanced vision system for mobile vehicles, comprising:
   an array of vision sensors mounted on a vehicle, each sensor being capable of generating image signals;
   a processor for producing an output signal from a selected sampling of said image signals;
   a display connected to receive the output signal from the processor and superimpose images generated by the output signal on a see-through screen which also selectively permits an operator to view actual images disposed in front of said screen; and
   a controller for controlling an intensity of light permitted to pass through said screen and for alternatively selectively disabling selected regions of said screen so that light cannot pass through those selected regions;
   wherein both the images generated by the output signal and the actual images are in conformity with one another, to create a seamless effect for the operator and wherein images generated by the output signal include an exterior view relative to the vehicle, a portion of the exterior view being partially blocked by the vehicle in the actual images viewable by the operator, but the images generated by the output signal of the exterior view being displayable superimposed and in conformity with the actual images on the see-through screen and including the portion of the exterior view that is partially blocked by the vehicle in the actual images.

24. The system of claim 23, wherein said display comprises a helmet-mounted display, and said screen comprises a helmet visor.

25. The system of claim 24, and further comprising a tracking system associated with the helmet-mounted display that monitors the movement of the head of the wearer of the display and transmits a tracking signal to the processor, the processor producing the output signal based on feedback from the tracking signal.

26. The system of claim 25, wherein said tracking system comprises an emitter fixedly mounted on a helmet of the operator and a single detector disposed in spaced relation to said emitter.

27. The system of claim 23, wherein said controller includes a manual override capability so that the operator can selectively manually control and select particular output images from various ones of said sensors.

28. The system as recited in claim 23, wherein said vision sensors are immovably mounted on the vehicle.

29. An enhanced vision system for an aircraft, comprising:
   an array of sensors mounted on the aircraft;
   an imaging system to process signals from each sensor of the array of sensors to produce an output signal;
   a display to superimpose images generable from the output signal on an actual real-time scene being viewed by the operator, wherein the images generable by the output signal are in conformity with the actual real-time scene and wherein images generated by the output signal include an exterior view relative to the aircraft, a portion of the exterior view being partially blocked by the aircraft in the actual real-time scene being viewed by the operator, but the images generable by the output signal including the exterior view being displayable superimposed and in conformity with the real-time actual scene and including the portion of the exterior view that is partially blocked by the vehicle in the real-time actual scene.

30. The system of claim 29, further comprising a tracking system to monitor real-time movement of the operator's head to alter which sensors of the array of sensors are sampled to generate the exterior view relative to the aircraft.

31. The system of claim 30, wherein a number of images produced by the sensors are scannable by the operator moving his head.

32. The system of claim 29, wherein the array of sensors comprise a sensor that has a higher resolution than the other sensors and is forward-looking for use in performing a group of operations including at least one of takeoff, air-to-air refueling, and final approach and landing.

33. The system of claim 29, wherein the images generable by the output signal comprise an enhanced exterior view relative to the aircraft that is substantially more extensive than that provided through a cockpit window of the aircraft.

34. The system of claim 29, wherein the images generable by the output signal are arrangeable in tiles that can be juxtaposed and viewed on the display, and wherein the system further comprises a picture-in-picture tile positionable relative to the other tiles to present an image generable by a sensor on another aircraft on the display.

35. The system of claim 29, further comprising a moving map tile presentable on the display.

36. The system of claim 35, wherein the moving map tile is adapted to be supplied information from at least one of a group comprising a global positioning system (GPS), an airborne warning and control system (AWACS), and other aircraft.

* * * * *